United States Patent
Zhang

(10) Patent No.: US 9,148,891 B2
(45) Date of Patent: Sep. 29, 2015

(54) METHOD AND APPARATUS FOR CONTROLLING TRAFFIC OF MULTI-MODE BASE STATION

(71) Applicant: HUAWEI TECHNOLOGIES CO., LTD., Shenzhen (CN)

(72) Inventor: Ling Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 164 days.

(21) Appl. No.: 13/913,767

(22) Filed: Jun. 10, 2013

(65) Prior Publication Data

US 2013/0272130 A1     Oct. 17, 2013

Related U.S. Application Data

(63) Continuation of application No. PCT/CN2011/083844, filed on Dec. 12, 2011.

(30) Foreign Application Priority Data

Dec. 10, 2010   (CN) .......................... 2010 1 0583289

(51) Int. Cl.
*H04W 72/12*     (2009.01)
*H04W 28/10*     (2009.01)
(Continued)

(52) U.S. Cl.
CPC .......... *H04W 72/1252* (2013.01); *H04L 47/22* (2013.01); *H04L 47/29* (2013.01); *H04W 28/10* (2013.01); *H04L 47/14* (2013.01); *H04L 47/28* (2013.01)

(58) Field of Classification Search
None
See application file for complete search history.

(56) References Cited

U.S. PATENT DOCUMENTS

2003/0165141 A1   9/2003   Hagsand et al. .......... 370/395.21
2005/0239435 A1   10/2005  Ikeda et al. .................... 455/403
(Continued)

FOREIGN PATENT DOCUMENTS

CN   1589051 A   3/2005
CN   1729709 A   2/2006
(Continued)

OTHER PUBLICATIONS

Magaña, Eduardo, Daniel Morató, and Pravin Varaiya. "Tuning the weights in WFQ schedulers for the maximization of carried best effort traffic." 10th International Conference on Telecommunications, IEEE 2003, Tahiti, Papeete, French Polynesia, Feb. 23-Mar. 1, 2003. pp. 1-6.

(Continued)

*Primary Examiner* — Kodzovi Acolatse
(74) *Attorney, Agent, or Firm* — Staas & Halsey LLP

(57) ABSTRACT

The present invention discloses a method and an apparatus for controlling traffic of a multi-mode base station to overcome the unfair or unreasonable traffic allocation between different systems of a multi-mode base station in the prior art. The technical solutions provided by embodiments of the present invention include: obtaining target traffic of any system in the multi-mode base station according to a preset traffic allocation ratio; decreasing an increment step size of the system if current traffic of the system is greater than the target traffic and bandwidth of the multi-mode base station is idle; or increasing a decrement step size of the system if current traffic of the system is greater than the target traffic and bandwidth of the multi-mode base station is congested; and controlling traffic of the system in the multi-mode base station according to the adjusted increment step size or decrement step size.

11 Claims, 4 Drawing Sheets

(51) Int. Cl.
   *H04L 12/815* (2013.01)
   *H04L 12/801* (2013.01)
   *H04L 12/841* (2013.01)

(56) References Cited

U.S. PATENT DOCUMENTS

2009/0147680 A1* 6/2009 Liu ............................ 370/232
2013/0210447 A1* 8/2013 Moe et al. .................. 455/453

FOREIGN PATENT DOCUMENTS

| CN | 1852228 A | 10/2006 |
| CN | 1984068 A | 6/2007 |
| CN | 102006628 A | 4/2011 |
| EP | 2 096 804 A1 | 9/2009 |
| WO | 02/37724 A1 | 5/2002 |

OTHER PUBLICATIONS

Choi, Chong-Ho and Eun-Chan Park. "Feedback-Based Adaptive Packet Marking for Proportional Bandwidth Allocation." *IEEE Transactions on Parallel and Distributed Systems*, 18(2), pp. 225-239, (Feb. 2007).

Li, An-Jun, Yu-Beng Qian, and Yu Zheng. Abstract of "Improved DBA algorithm based on traffic prediction." *Journal of Computer Applications* 30(1), pp. 124-126, (2010).

International Search Report issued Mar. 15, 2012, in corresponding International Application No. PCT/CN2011/083844.

Chinese Office Action issued Jul. 27, 2012, in corresponding Chinese Patent Application No. 201010583289.6.

Extended European Search Report issued Feb. 5, 2014, in corresponding European Patent Application No. 11846912.1.

International Search Report mailed Mar. 15, 2012 corresponding to International Application No. PCT/CN2011/083844.

* cited by examiner

US 9,148,891 B2

METHOD AND APPARATUS FOR CONTROLLING TRAFFIC OF MULTI-MODE BASE STATION

CROSS-REFERENCE TO RELATED APPLICATION

This application is a continuation of International Application No. PCT/CN2011/083844, filed on Dec. 12, 2011, which claims priority to Chinese Patent Application No. 201010583289.6, filed on Dec. 10, 2010, both of which are hereby incorporated by reference in their entireties.

FIELD OF THE INVENTION

The present invention relates to radio communication technologies, and in particular, to a method and an apparatus for controlling traffic of a multi-mode base station.

BACKGROUND OF THE INVENTION

With rapid development of communication technologies, communication systems are evolving. The communication system evolves from the earliest analog communication to the digital GSM system, WCDMA system, CDMA system, TD-SCDMA system, and the latest LTE system. To avoid waste of investments in the existing systems of different systems and accomplish smooth evolution from one system to another, the multi-system base station, namely, the multi-mode base station that supports multiple wireless systems, is applied more and more widely.

An important feature of the multi-mode base station is multi-mode co-transmission. In the case of multi-mode co-transmission, an operator usually expects to save the transmission bandwidth by sharing the transmission bandwidth between different systems. For example, if the maximum bandwidth required by a mobile base station NodeB in a WCDMA-based 3G network is A, and the maximum bandwidth required by an evolved Node B eNodeB in an LTE network is B, the bandwidth C expected by the operator from the multi-mode base station is less than the sum of A and B. However, because C is less than the sum of A and B, bandwidth congestion of the multi-mode base station will occur when the services of different systems are all busy.

One method for solving bandwidth congestion in the prior art is to exercise traffic control on every system in the multi-mode base station. The detailed method includes: sending or receiving a detection packet, detecting the network delay, delay variation, and packet loss according to the detection packet, and judging whether the bandwidth of each system in the multi-mode base station is congested or idle; if the bandwidth of a specific system of the multi-mode base station is idle, controlling to increase traffic of the system, or, if the bandwidth of a specific system of the multi-mode base station is congested, controlling to decrease traffic of the system. This method can hardly take care of the traffic requirements of other systems when exercising traffic control on a specific system of the multi-mode base station, which leads to unfair or unreasonable traffic allocation between different systems.

SUMMARY OF THE INVENTION

An embodiment of the present invention provides a method and an apparatus for controlling traffic of a multi-mode base station.

In one aspect, an embodiment of the present invention provides a method for controlling traffic of a multi-mode base station, including: obtaining target traffic of any system in the multi-mode base station according to a preset traffic allocation ratio; decreasing an increment step size of the system if current traffic of the system is greater than the target traffic and bandwidth of the multi-mode base station is idle; or increasing a decrement step size of the system if current traffic of the system is greater than the target traffic and bandwidth of the multi-mode base station is congested; and controlling traffic of the system in the multi-mode base station according to the adjusted increment step size or decrement step size.

In another aspect, an embodiment of the present invention provides an apparatus for controlling traffic of a multi-mode base station, including:

a target traffic obtaining unit, configured to obtain target traffic of any system in the multi-mode base station according to a preset traffic allocation ratio;

a first adjusting unit, configured to decrease an increment step size of the system if current traffic of the system is greater than the target traffic obtained by the target traffic obtaining unit and bandwidth of the multi-mode base station is idle, or increase a decrement step size of the system if current traffic of the system is greater than the target traffic obtained by the target traffic obtaining unit and bandwidth of the multi-mode base station is congested; and a controlling unit, configured to control traffic of the system in the multi-mode base station according to the increment step size or decrement step size adjusted by the first adjusting unit.

By using the method and apparatus for controlling traffic of a multi-mode base station in the embodiments of the present invention, when the current traffic of any system in the multi-mode base station is greater than the target traffic of the system, the increment step size or decrement step size of the system is adjusted correspondingly according to usage of the bandwidth of the multi-mode base station, and the traffic of the system is controlled according to the adjusted step size, so that the traffic of the system approaches the target traffic corresponding to the traffic allocation ratio of the system in the traffic control process, and the traffic control of the multi-mode base station is implemented. With the embodiments of the present invention, traffic can be allocated between different systems of a multi-mode base station properly.

BRIEF DESCRIPTION OF THE DRAWINGS

To illustrate the technical solutions in the embodiments of the present invention more clearly, the accompanying drawings used in the description of the embodiments are briefly described hereunder. Apparently, the accompanying drawings illustrate only some embodiments of the present invention, and persons of ordinary skill in the art can derive other drawings from these drawings without any creative effort.

DETAILED DESCRIPTION OF THE EMBODIMENTS

The technical solutions in the embodiments of the present invention are completely and clearly described in following with reference to the accompanying drawings in the embodiments of the present invention. Evidently, the drawings described below are merely about some embodiments of the present invention rather than all embodiments. All other embodiments, which can be derived by persons of ordinary skill in the art from the embodiments given herein without making any creative effort, shall fall within the protection scope of the present invention.

To overcome the unfair or unreasonable traffic allocation problem between different systems of a multi-mode base station in the prior art, embodiments of the present invention provides a method and an apparatus for controlling traffic of a multi-mode base station.

Figure 1:
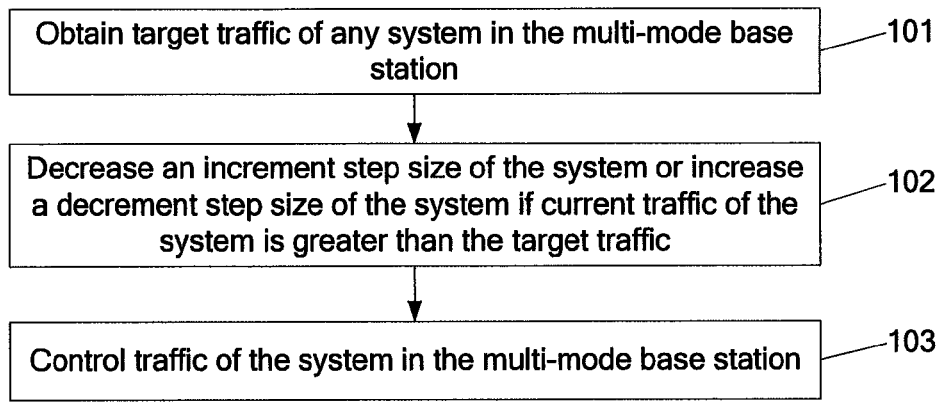
FIG. 1 is a flowchart of a method for controlling traffic of a multi-mode base station according to a first embodiment of the present invention.

As shown in FIG. 1, a method for controlling traffic of a multi-mode base station in a first embodiment of the present invention includes:

Step 101: Obtain target traffic of any system in the multi-mode base station according to a preset traffic allocation ratio.

In this embodiment, the traffic allocation ratio preset in step 101 may be a fair ratio provided by a user according to traffic models and bandwidth requirements of different systems in the multi-mode base station. This traffic allocation ratio is a ratio expected by the user to balance the traffic between different systems when the bandwidth of the multi-mode base station is congested.

In this embodiment, the target traffic in step 101 refers to the traffic that corresponds to the traffic allocation ratio when the traffic of any system in the multi-mode base station reaches the traffic allocation ratio.

For example, it is assumed that the bandwidth of the multi-mode base station is 10 Mbps, the multi-mode base station supports the WCDMA system and the LTE system, and the fair ratio provided by the user between the WCDMA system and the LTE system is 3:7, that is, when the bandwidth of the multi-mode base station is congested, the traffic of the multi-mode base station that can be allocated to the WCDMA system is 3 Mbps and the traffic that can be allocated to the LTE system is 7 Mbps. Accordingly, 3 Mbps is the target traffic of the WCDMA system, and 7 Mbps is the target traffic of the LTE system.

In this embodiment, the any system in the multi-mode base station in step 101 may include: GSM system, WCDMA system, CDMA system, TD-SCDMA system, or LTE system.

Step 102: Decrease the increment step size of the system if the current traffic of the system is greater than the target traffic of the system and the bandwidth of the multi-mode base station is idle; or increase the decrement step size of the system if the current traffic of the system is greater than the target traffic of the system and the bandwidth of the multi-mode base station is congested.

In this embodiment, the increment step size of the system decreases, to slow down the traffic increase of the system, if the current traffic of the system is greater than the target traffic of the system and the bandwidth of the multi-mode base station is idle; and the decrement step size of the system increases, to quicken the traffic decrease of the system, if the current traffic of the system is greater than the target traffic of the system and the bandwidth of the multi-mode base station is congested.

In this embodiment, a damping coefficient or other means may be used to decrease the increment step size or increase the decrement step size in step 102, which are not detailed herein exhaustively.

Step 103: Control the traffic of the system in the multi-mode base station according to the adjusted increment step size or decrement step size.

In this embodiment, if the current traffic of a system in the multi-mode base station is greater than the target traffic of the system, when the bandwidth of the multi-mode base station is idle, the rising of the traffic of the system in the multi-mode base station is controlled according to the adjusted increment step size in step 103; when the bandwidth of the multi-mode base station is congested, the decreasing of the traffic of the system in the multi-mode base station is controlled according to the adjusted decrement step size in step 103. Finally, the traffic of the system is balanced when it approaches the target traffic of the system, and the traffic ratio of the system fulfills the traffic allocation ratio required by the user.

In this embodiment, the method may further include the following step: If the current traffic of the system is not greater than the target traffic of the system, when the bandwidth of the multi-mode base station is idle, using the increment step size configured by the multi-mode base station for the system to control traffic of the multi-mode base station, or, when bandwidth of the multi-mode base station is congested, using the decrement step size configured by the multi-mode base station for the system to control traffic of the multi-mode base station; or, increasing the increment step size of the system or decreasing the decrement step size of the system, and using the adjusted increment step size or decrement step size to control traffic of the multi-mode base station, and specifically, increasing the increment step size of the system when the bandwidth of the multi-mode base station is idle and decreasing the decrement step size of the system when the bandwidth of the multi-mode base station is congested, which is not described herein exhaustively.

In this embodiment, if the current traffic of a system in the multi-mode base station is greater than the target traffic of the system, whether to adjust the increment step size of the system or to adjust the decrement step size of the system may be judged by judging whether the bandwidth of the multi-mode base station is congested or idle. If the bandwidth of the multi-mode base station is congested, the decrement step size of the system can be adjusted, for example, the decrement step size can be increased; if the bandwidth of the multi-mode base station is idle, the increment step size of the system can be adjusted, for example, the increment step size can be decreased. In practical applications, increasing the increment step size of the system may include: obtaining a damping coefficient of the system, and increasing the increment step size of the system according to the damping coefficient when the bandwidth of the multi-mode base station is idle. Decreasing the decrement step size of the system includes: obtaining the damping coefficient of the system, and decreasing the decrement step size of the system according to the damping coefficient when the bandwidth of the multi-mode base station is congested.

Alternatively, in this embodiment of the present invention, whether the bandwidth of the multi-mode base station is congested can be first judged. When the bandwidth of the multi-mode base station is congested, if the current traffic of a system in the multi-mode base station is greater than the target traffic of the system, the decrement step size of the system is increased, and if the current traffic of the system is not greater than the target traffic of the system, the decrement step size of the system is decreased; or, when the bandwidth of the multi-mode base station is idle, if the current traffic of a system in the multi-mode base station is greater than the target traffic of the system, the increment step size of the system is decreased, and if the current traffic of the system is not greater than the target traffic of the system, the increment step size of the system is increased.

The detailed method for judging whether the bandwidth of the multi-mode base station is congested or the bandwidth of the multi-mode base station is idle may include: sending or receiving a detection packet, and detecting network delay, delay variation, and packet loss according to the detection packet. Generally, if the delay increases, the delay varies more sharply, or the rate of packet loss increases, it means that the bandwidth of the multi-mode base station is congested; conversely, if the delay is steady, the delay varies steadily, and no packet loss occurs, it means that the bandwidth of the multi-mode base station is idle. In this embodiment, there may be more other methods for judging whether the bandwidth of the multi-mode base station is congested or the bandwidth of the multi-mode base station is idle, which are not detailed herein exhaustively.

The method for controlling traffic of the multi-mode base station in this embodiment may be applied in the multi-mode base station to control traffic of each system. In practical applications, the multi-mode base station may control traffic of each system by implementing the foregoing method for controlling traffic.

By using the method for controlling traffic of a multi-mode base station in this embodiment of the present invention, when the current traffic of any system in the multi-mode base station is greater than the target traffic of the system, the increment step size or decrement step size of the system is adjusted accordingly according to usage of the bandwidth of the multi-mode base station, and the traffic of the system is controlled according to the adjusted step size, so that the traffic of the system approaches the target traffic corresponding to the traffic allocation ratio of the system in the traffic control process, and the traffic control of the multi-mode base station is implemented. With this embodiment of the present invention, traffic between different systems of a multi-mode base station can be allocated properly.

Figure 2:
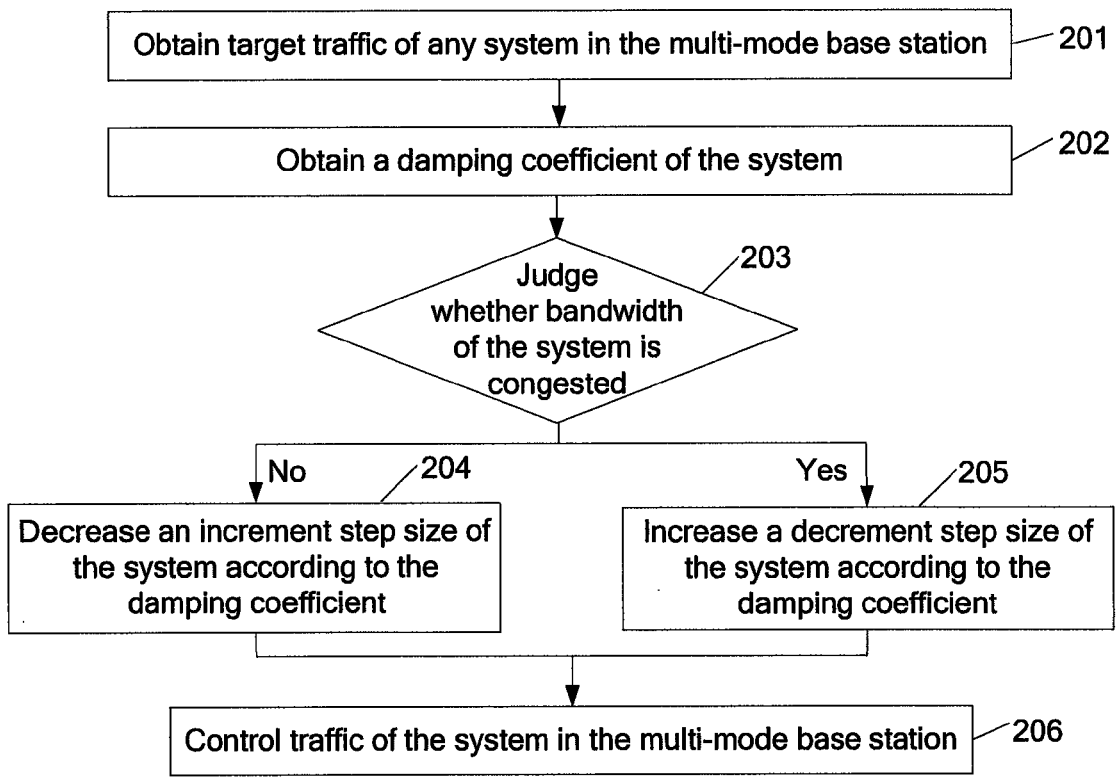
FIG. 2 is a flowchart of a method for controlling traffic of a multi-mode base station according to a second embodiment of the present invention.

As shown in FIG. 2, a method for controlling traffic of a multi-mode base station in a second embodiment of the present invention includes:

Step 201: Obtain target traffic of any system in the multi-mode base station according to a preset traffic allocation ratio.

In this embodiment, the traffic allocation ratio preset in step 201 may be a fair ratio provided by a user according to traffic models of different systems in the multi-mode base station and the bandwidth requirement of the multi-mode base station. This traffic allocation ratio is a ratio expected by the user to balance the traffic between different systems when the bandwidth of the multi-mode base station is congested.

In this embodiment, the any system in the multi-mode base station in step 201 may include: GSM system, WCDMA system, CDMA system, TD-SCDMA system, or LTE system.

Step 202: Obtain a damping coefficient of the system.

In this embodiment, the damping coefficient set for each system in the multi-mode base station may be the same or different. If the same damping coefficient is set for each system in the multi-mode base station uniformly, the damping coefficient is effective on each system in the multi-mode base station; if a damping coefficient is set for a system in the multi-mode base station separately, the damping coefficient is effective on only this system in the multi-mode base station.

In this embodiment, the damping coefficient may be a constant. The damping coefficient may also be a number that is in proportion to the difference between the current traffic of the system and the target traffic, or may be another value, which is not restricted in this embodiment of the present invention.

When the damping coefficient is a number that is in proportion to the difference between the current traffic of the system and the target traffic, determining the damping coefficient may include:

using the difference between the current traffic of the system and the target traffic as a current deviation value of the traffic of the system;

using the difference between the bandwidth of the multi-mode base station and the target traffic as a total deviation value of the traffic of the system; and using the ratio of the current deviation value to the total deviation value as the damping coefficient.

Therefore, the mathematic expression of the damping coefficient is: Damping coefficient=(Current traffic−Target traffic)/(Bandwidth of multi-mode base station−Target traffic). The bandwidth of the multi-mode base station is the maximum value of traffic that can be transmitted by the multi-mode base station.

The value of the damping coefficient provided in this embodiment is not limited to the description above, and may be expressed in another form, which is not detailed herein exhaustively.

Step 203: If the current traffic of the system is greater than the target traffic of the system, judge whether the bandwidth of the multi-mode base station is congested. If the bandwidth of the multi-mode base station is not congested, proceed to step 204; if the bandwidth of the multi-mode base station is congested, proceed to step 205.

In step 203 in this embodiment, the detailed method for judging whether the bandwidth of the multi-mode base station is congested may include: sending or receiving a detection packet, and detecting network delay, delay variation, and packet loss according to the detection packet. Generally, if the delay increases, the delay varies more sharply, or the rate of packet loss increases, it means that the bandwidth of the multi-mode base station is congested; conversely, if the delay is steady, the delay varies steadily, and no packet loss occurs, it means that the bandwidth of the multi-mode base station is idle.

In step 203 in this embodiment, there may be more other methods for judging whether the bandwidth of the multi-mode base station is congested, which are not detailed herein exhaustively.

Step 204: Decrease the increment step size of the system according to the damping coefficient, and proceed to step 206.

In step 204 in this embodiment, the method for decreasing the increment step size of the system according to the damping coefficient when the bandwidth of the multi-mode base station is idle may include: decreasing the increment step size of the system to the difference between a preset step size of the system and the damping coefficient.

In this embodiment, there may be many methods for decreasing the increment step size of the system according to the damping coefficient, which are not detailed herein exhaustively.

Step 205: Increase the decrement step size of the system according to the damping coefficient, and proceed to step 206.

In step 205 in this embodiment, the method for increasing the decrement step size of the system according to the damping coefficient when the bandwidth of the multi-mode base station is congested may include: increasing the decrement step size of the system to the sum of a preset step size of the system and the damping coefficient.

In this embodiment, there may be many methods for increasing the decrement step size of the system according to the damping coefficient, which are not detailed herein exhaustively.

Step 206: Control the traffic of the system in the multi-mode base station according to the increment step size obtained in step 204 or the decrement step size obtained in step 205.

In this embodiment, if the current traffic of a system in the multi-mode base station is greater than the target traffic of the system, when the bandwidth of the multi-mode base station is idle, the rising of the traffic of the system in the multi-mode base station is controlled according to the adjusted increment step size in step 206; when the bandwidth of the multi-mode base station is congested, the decreasing of the traffic of the system in the multi-mode base station is controlled according to the adjusted decrement step size in step 206. Finally, the traffic of the system is balanced when it approaches the target traffic of the system, and the traffic ratio of the system fulfills the traffic allocation ratio required by the user.

In this embodiment, the method may further include the following step: If the current traffic of the system is not greater than the target traffic of the system, when the bandwidth of the multi-mode base station is idle, using the increment step size configured by the multi-mode base station for the system to control traffic of the multi-mode base station, or, when bandwidth of the multi-mode base station is congested, using the decrement step size configured by the multi-mode base station for the system to control traffic of the multi-mode base station; or increasing the increment step size of the system or decreasing the decrement step size of the system, and using the adjusted increment step size or decrement step size to control traffic of the multi-mode base station, and specifically, increasing the increment step size of the system when the bandwidth of the multi-mode base station is idle, and decreasing the decrement step size of the system when the bandwidth of the multi-mode base station is congested, which is not described herein exhaustively.

The method for controlling traffic of the multi-mode base station in this embodiment may be applied in the multi-mode base station to control traffic of each system. In practical applications, the multi-mode base station may control traffic of each system by implementing the foregoing method for controlling traffic.

By using the method for controlling traffic of a multi-mode base station in this embodiment of the present invention, when the current traffic of any system in the multi-mode base station is greater than the target traffic of the system, the increment step size or decrement step size of the system is adjusted accordingly according to usage of the bandwidth of the multi-mode base station, and the traffic of the system is controlled according to the adjusted step size, so that the traffic of the system approaches the target traffic corresponding to the traffic allocation ratio of the system in the traffic control process, and the traffic control of the multi-mode base station is implemented. With this embodiment of the present invention, traffic between different systems of a multi-mode base station can be allocated properly.

Figure 3:
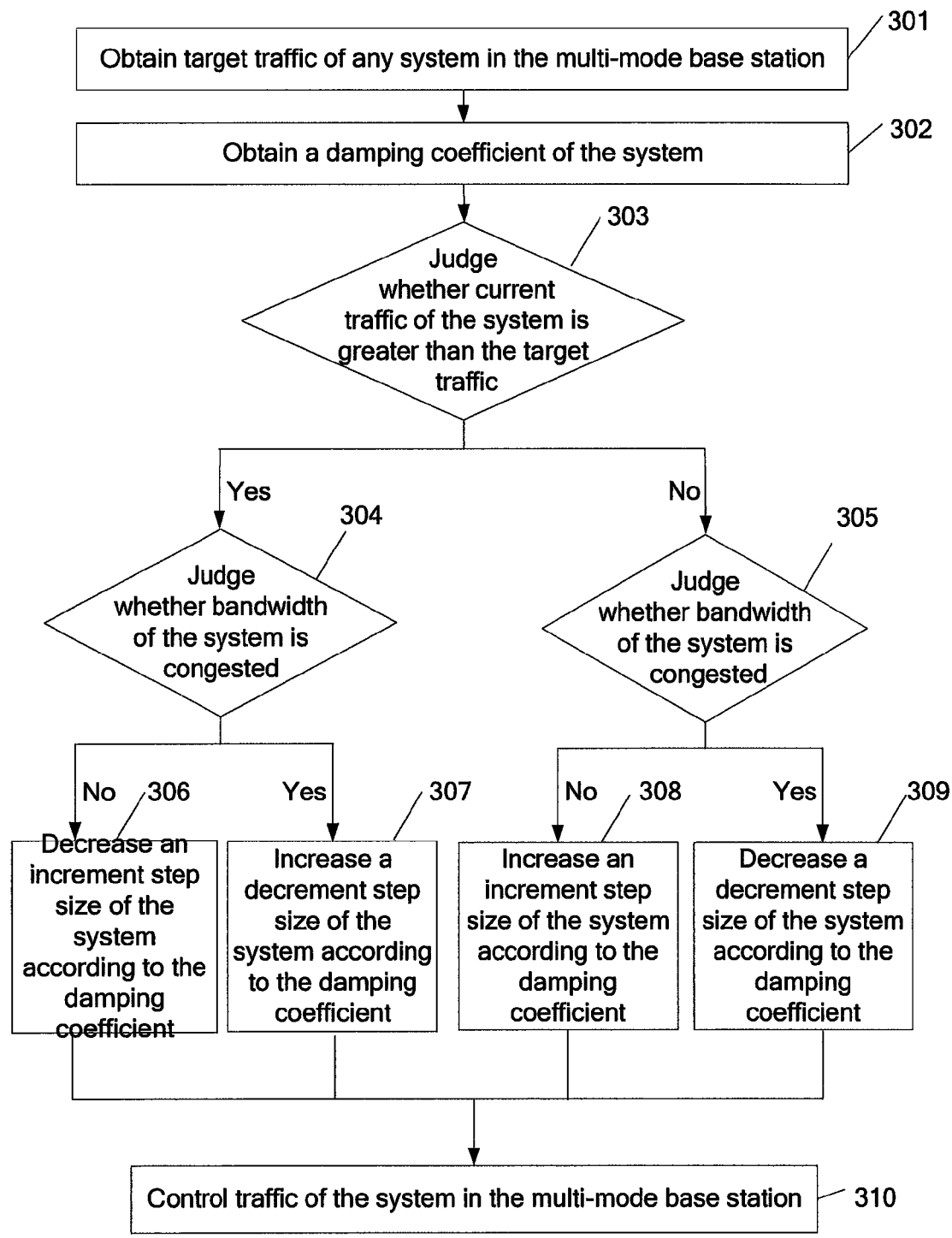
FIG. 3 is a flowchart of a method for controlling traffic of a multi-mode base station according to a third embodiment of the present invention.

As shown in FIG. 3, a method for controlling traffic of a multi-mode base station in a third embodiment of the present invention includes:

Step 301 and step 302: Obtain the target traffic and the damping coefficient of any system in the multi-mode base station. For the detailed obtaining process, reference can be made to step 201 and step 202 in FIG. 2.

Step 303: Judge whether the current traffic of the system is greater than the target traffic of the system. If the current traffic of the system is greater than the target traffic of the system, proceed to step 304; if the current traffic of the system is not greater than the target traffic of the system, proceed to step 305.

Step 304 and step 305: Judge whether the bandwidth of the multi-mode base station is congested. For the detailed judgment process, reference can be made to step 203 in FIG. 2.

Step 306 and step 307: Adjust the increment step size or decrement step size of the system according to the judgment result in step 304. For the detailed adjustment process, reference can be made to step 204 and step 205 in FIG. 2.

Step 308: Increase the increment step size of the system according to the damping coefficient when the bandwidth of the multi-mode base station is idle.

In step 308 in this embodiment, the method for increasing the increment step size of the system according to the damping coefficient when the bandwidth of the multi-mode base station is idle may include: increasing the increment step size of the system to the sum of a preset step size of the system and the damping coefficient.

In this embodiment, there may be many methods for increasing the increment step size of the system according to the damping coefficient, which are not detailed herein exhaustively.

Step 309: Decrease the decrement step size of the system according to the damping coefficient when the bandwidth of the multi-mode base station is congested.

In step 309 in this embodiment, the method for decreasing the decrement step size of the system according to the damping coefficient may include: decreasing the decrement step size of the system to the difference between a preset step size of the system and the damping coefficient.

In this embodiment, there may be many methods for decreasing the decrement step size of the system according to the damping coefficient, which are not detailed herein exhaustively.

Step 310: Control traffic of the multi-mode base station. For the detailed control process, reference can be made to step 205 in FIG. 2.

In this embodiment, after step 302, whether the bandwidth of the multi-mode base station is congested can be judged first, and then whether the current traffic of the system is greater than the target traffic is judged. After completion of the judgment, the step size adjustment process and the traffic control process of the multi-mode base station are similar to steps 306 to 310, and details are not described herein.

To enable persons skilled in the art to clearly understand the technical solutions provided by the embodiments of the present invention, the following describes the technical solutions in detail by taking an example that a WCDMA system and an LTE system share the bandwidth of a multi-mode base station.

It is assumed that the multi-mode base station sets the increment step size and the decrement step size for each of the WCDMA system and the LTE system to 10%. In this embodiment, different increment step sizes and decrement step sizes may be configured for different systems in the multi-mode base station.

It is assumed that the bandwidth of the multi-mode base station is 10 Mbps, the user configures a traffic allocation ratio as 3:7 according to traffic models of the WCDMA system and the LTE system and the bandwidth requirement of the multi-mode base station, that is, when the traffic of the multi-mode base station is balanced between the WCDMA system and the LTE system, the traffic of the WCDMA system is 3 Mbps and the traffic of the LTE system is 7 Mbps.

If the traffic of the WCDMA system is 3.7 Mbps and the traffic of the LTE system is 5 Mbps at a moment, and the WCDMA system and the LTE system detect that the bandwidth of the multi-mode base station is idle by sending or receiving a detection packet, the traffic of both systems needs to be increased. The current traffic of the WCDMA system is 3.7 Mbps, which is greater than 3 Mbps; and the current damping coefficient of the system is (3.7−3)/(10−3)=10%. Therefore, the increment step size of the system is 10% (1−10%)=9%, the increment step size of the traffic of the WCDMA system decreases, and the traffic increase of the system slows down. The current traffic of the LTE system is 5 Mbps, which is less than 7 Mbps, the increment step size of the system may keep unchanged, or the increment step size of the system is 10% [1−(−67%)]=16.7% according to the current damping coefficient (5−7)/(10−7)=−67% of the system, so that the increment step size of the traffic of the system increases, and the traffic increase speed of the LTE system is greater than the traffic increase speed of the WCDMA system.

When the bandwidth of the multi-mode base station is idle, the traffic of the WCDMA system and the traffic of the LTE system increase, and the traffic increase speed of the LTE system is greater than the traffic increase speed of the WCDMA system. At another moment, it may be detected that the bandwidth of the multi-mode base station is congested, and for this moment, it is assumed that the traffic of the WCDMA system is 4.4 Mbps and the traffic of the LTE system is 5.6 Mbps. Because it is detected that the bandwidth of the multi-mode base station is congested, the traffic of each system needs to be decreased. The current traffic of the WCDMA system is 4.3 Mbps, which is greater than 3 Mbps; and the current damping coefficient of the system is (4.4−3)/(10−3)=20%. Therefore, the decrement step size of the system is 10% (1+20%)=12%, the decrement step size of the traffic of the WCDMA system increases, and the traffic decrease of the system quickens. The current traffic of the LTE system is 5.6 Mbps, which is less than 7 Mbps, the decrement step size of the system may keep unchanged, or the decrement step size of the system is 10% [1+(−47%)]=5.3% according to the current damping coefficient (5.6−7)/(10−7)=−47% of the system. In this way, the decrement step size of the traffic of the system decreases, and the traffic decrease speed of the LTE system is less than the traffic decrease speed of the WCDMA system.

When the bandwidth of the multi-mode base station is congested, the traffic of the WCDMA system and the traffic of the LTE system decrease, and the traffic decrease speed of the LTE system is less than the traffic decrease speed of the WCDMA system. After the decrease, it may be detected again that the bandwidth of the multi-mode base station is idle, and therefore, the traffic of each system increases accordingly, and traffic increase speed of the LTE system is greater than the traffic increase speed of the WCDMA system. Through persistent traffic control, the traffic of the WCDMA system and the traffic of the LTE system are balanced when the traffic ratio therebetween approaches the traffic allocation ratio. That is, the traffic is controlled to accomplish the balance between all systems according to the traffic allocation ratio.

The method for controlling traffic of the multi-mode base station in this embodiment may be applied in the multi-mode base station to control traffic of each system. In practical applications, the multi-mode base station may control traffic of each system by implementing the foregoing method for controlling traffic.

By using the method for controlling traffic of a multi-mode base station in this embodiment of the present invention, when the current traffic of any system in the multi-mode base station is greater than the target traffic of the system, the increment step size or decrement step size of the system is adjusted accordingly according to usage of the bandwidth of the multi-mode base station, and the traffic of the system is controlled according to the adjusted step size, so that the traffic of the system approaches the target traffic corresponding to the traffic allocation ratio of the system in the traffic control process, and the traffic control of the multi-mode base station is implemented. With this embodiment of the present invention, traffic between different systems of a multi-mode base station can be allocated properly.

Figure 4:
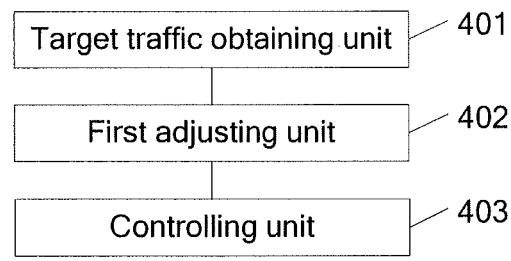
FIG. 4 is a schematic structural diagram of an apparatus for controlling traffic of a multi-mode base station according to a fourth embodiment of the present invention.

As shown in FIG. 4, an apparatus for controlling traffic of a multi-mode base station in a fourth embodiment of the present invention includes a target traffic obtaining unit 401, a first adjusting unit 402, and a controlling unit 403.

The target traffic obtaining unit 401 is configured to obtain target traffic of any system in the multi-mode base station according to a preset traffic allocation ratio.

In this embodiment, the traffic allocation ratio preset in the target traffic obtaining unit 401 may be a fair ratio provided by a user according to traffic models of different system in the multi-mode base station and the bandwidth requirement of the multi-mode base station. This traffic allocation ratio is a ratio expected by the user to balance the traffic between different systems when the bandwidth of the multi-mode base station is congested.

In this embodiment, the target traffic in the target traffic obtaining unit 401 refers to the traffic that corresponds to the traffic allocation ratio when the traffic of any system in the multi-mode base station reaches the traffic allocation ratio.

In this embodiment, the any system in the multi-mode base station in the target traffic obtaining unit 401 may include: GSM system, WCDMA system, CDMA system, TD-SCDMA system, or LTE system.

The first adjusting unit 402 is configured to decrease an increment step size of the system if current traffic of the system is greater than the target traffic obtained by the target traffic obtaining unit 401 and bandwidth of the multi-mode base station is idle, or increase a decrement step size of the system if the current traffic of the system is greater than the target traffic obtained by the target traffic obtaining unit 401 and the bandwidth of the multi-mode base station is congested.

In this embodiment, the increment step size of the system decreases, to slow down the traffic increase of the system, if the current traffic of the system is greater than the target traffic of the system and the bandwidth of the multi-mode base station is idle; and the decrement step size of the system increases, to quicken the traffic decrease of the system, if the current traffic of the system is greater than the target traffic of the system and the bandwidth of the multi-mode base station is congested.

In this embodiment, a damping coefficient or other means may be used to decrease the increment step size or increase the decrement step size in the first adjusting unit 402, and details are not described herein exhaustively.

The controlling unit 403 is configured to control traffic of the system in the multi-mode base station according to the increment step size or decrement step size adjusted by the first adjusting unit 402.

In this embodiment, if the current traffic of a system in the multi-mode base station is greater than the target traffic of the system, when the bandwidth of the multi-mode base station is idle, the controlling unit 403 controls, according to the increment step size adjusted by the first adjusting unit 402, the traffic of the system in the multi-mode base station to rise; if the current traffic of a system in the multi-mode base station is greater than the target traffic of the system, when the bandwidth of the multi-mode base station is congested, the controlling unit 403 controls, according to the decrement step size adjusted by the first adjusting unit 402, the traffic of the system in the multi-mode base station to decrease. Finally, the traffic of the system is balanced when it approaches the target traffic of the system, and the traffic ratio of the system fulfills the traffic allocation ratio required by the user.

In this embodiment, if the current traffic of a system in the multi-mode base station is greater than the target traffic of the system, whether to adjust the increment step size of the system or to adjust the decrement step size of the system can be judged by judging whether the bandwidth of the multi-mode base station is congested or the bandwidth of the multi-mode base station idle. If the bandwidth of the multi-mode base station is congested, the decrement step size of the system is adjusted; if the bandwidth of the multi-mode base station is idle, the increment step size of the system is adjusted.

Alternatively, in this embodiment, whether the bandwidth of the multi-mode base station is congested may be judged first. When the bandwidth of the multi-mode base station is congested, if the current traffic of a system in the multi-mode base station is greater than the target traffic of the system, the decrement step size of the system is increased, and if the current traffic of the system is not greater than the target traffic of the system, the decrement step size of the system is decreased; or, when the bandwidth of the multi-mode base station is idle, if the current traffic of a system in the multi-mode base station is greater than the target traffic of the system, the increment step size of the system is decreased, and if the current traffic of the system is not greater than the target traffic of the system, the increment step size of the system is increased.

The detailed method for judging whether the bandwidth of the multi-mode base station is congested or the bandwidth of the multi-mode base station is idle may include: sending or receiving a detection packet, and detecting network delay, delay variation, and packet loss according to the detection packet. Generally, if the delay increases, the delay varies more sharply, or the rate of packet loss increases, it means that the bandwidth of the multi-mode base station is congested; conversely, if the delay is steady, the delay varies steadily, and no packet loss occurs, it means that the bandwidth of the multi-mode base station is idle. In this embodiment, there may be more other methods for judging whether the bandwidth of the multi-mode base station is congested or the bandwidth of the multi-mode base station is idle, which are not detailed herein exhaustively.

Figure 5:
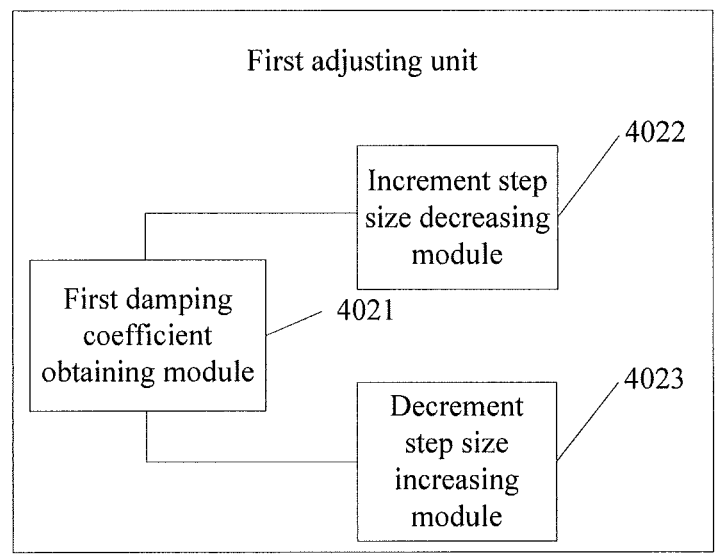
FIG. 5 is a first schematic structural diagram of a first adjusting unit in an apparatus for controlling traffic of a multi-mode base station shown in FIG. 4.

Further, as shown in FIG. 5, the first adjusting unit 402 in this embodiment may include a first damping coefficient obtaining module 4021 and an increment step size decreasing module 4022.

The first damping coefficient obtaining module 4021 is configured to obtain the damping coefficient of the system.

In this embodiment, the damping coefficients obtained by the first damping coefficient obtaining module 4021 may be the same or different. If the same damping coefficient is set for each system in the multi-mode base station uniformly, the damping coefficient is effective on each system in the multi-mode base station; if a damping coefficient is set for a system in the multi-mode base station separately, the damping coefficient is effective on only this system in the multi-mode base station.

The increment step size decreasing module 4022 is configured to decrease the increment step size of the system according to the damping coefficient obtained by the damping coefficient obtaining module 4021 when the bandwidth of the multi-mode base station is idle.

In this embodiment, the increment step size decreasing module 4022 may include: an increment step size decreasing sub-module, configured to decrease the increment step size of the system to the difference between a preset step size of the system and the damping coefficient when the bandwidth of the multi-mode base station is idle.

Or, the first adjusting unit 402 may include: a first damping coefficient obtaining module 4021 and a decrement step size increasing module 4023.

The first damping coefficient obtaining module 4021 is configured to obtain the damping coefficient of the system.

The decrement step size increasing module 4023 is configured to increase the decrement step size of the system according to the damping coefficient obtained by the damping coefficient obtaining module 4021 when the bandwidth of the multi-mode base station is congested.

In this embodiment, the decrement step size increasing module may include: a decrement step size increasing sub-module, configured to increase the decrement step size of the system to the sum of a preset step size of the system and the damping coefficient when the bandwidth of the multi-mode base station is congested.

Or, the first adjusting unit 402 may include a first damping coefficient obtaining module 4021, an increment step size decreasing module 4022, and a decrement step size increasing module 4023.

The first damping coefficient obtaining module 4021 is configured to obtain the damping coefficient of the system.

The increment step size decreasing module 4022 is configured to decrease the increment step size of the system according to the damping coefficient obtained by the damping coefficient obtaining module when the bandwidth of the multi-mode base station is idle.

The decrement step size increasing module 4023 is configured to increase the decrement step size of the system according to the damping coefficient obtained by the damping coefficient obtaining module when the bandwidth of the multi-mode base station is congested.

Figure 6:
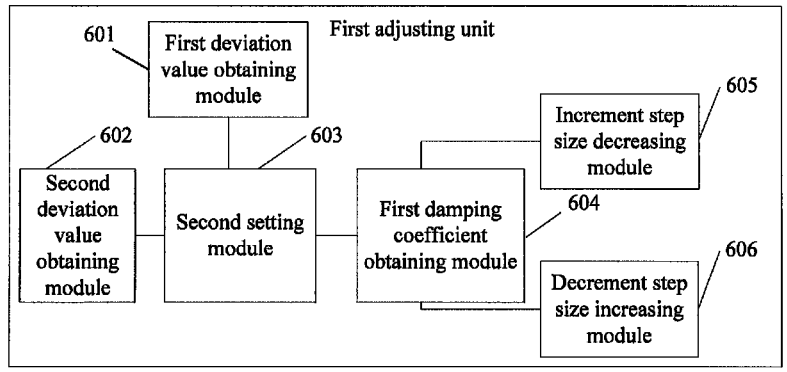
FIG. 6 is a second schematic structural diagram of a first adjusting unit in an apparatus for controlling traffic of a multi-mode base station shown in FIG. 4.

Further, as shown in FIG. 6, the first adjusting unit 402 in this embodiment may include:

a first deviation value obtaining module 601, configured to use a difference between the current traffic of the system and the target traffic as a current deviation value of the traffic of the system;

a second deviation value obtaining module 602, configured to use a difference between the bandwidth of the multi-mode base station and the target traffic as a total deviation value of the traffic of the system; and a second setting module 603, configured to set the damping coefficient to a ratio of the current deviation value obtained by the first deviation value obtaining module to the total deviation value obtained by the second deviation value obtaining module.

The first damping coefficient obtaining module 604, the increment step size decreasing module 605, and the decrement step size increasing module 606 are configured to obtain the damping coefficient set by the second setting module 603, and adjust the step size of the system according to the damping coefficient. For the detailed adjustment process, reference can be made to the first damping coefficient obtaining module 4021, the increment step size decreasing module 4022, and the decrement step size increasing module 4023 in FIG. 5.

Therefore, the mathematic expression of the damping coefficient may be: Damping coefficient=(Current traffic−Target traffic)/(Bandwidth of multi-mode base station−Target traffic). The bandwidth of the multi-mode base station is the maximum value of traffic that can be transmitted by the multi-mode base station.

The apparatus for controlling traffic of the multi-mode base station in this embodiment may be installed in a multi-mode base station.

By using the apparatus for controlling traffic of a multi-mode base station in this embodiment of the present invention, when the current traffic of any system in the multi-mode base station is greater than the target traffic of the system, the increment step size or decrement step size of the system is adjusted accordingly according to usage of the bandwidth of the multi-mode base station, and the traffic of the system is controlled according to the adjusted step size, so that the traffic of the system approaches the target traffic corresponding to the traffic allocation ratio of the system in the traffic control process, and the traffic control of the multi-mode base station is implemented. With this embodiment of the present invention, traffic between different systems of a multi-mode base station can be allocated properly.

Figure 7:
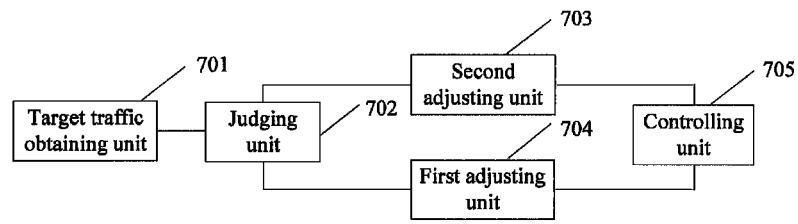
FIG. 7 is a schematic structural diagram of an apparatus for controlling traffic of a multi-mode base station according to a fifth embodiment of the present invention.

As shown in FIG. 7, an apparatus for controlling traffic of a multi-mode base station in a fifth embodiment of the present invention includes a target traffic obtaining unit 701, a judging unit 702, a second adjusting unit 703, a first adjusting unit 704, and a controlling unit 705.

The target traffic obtaining unit 701 is configured to obtain target traffic of any system in the multi-mode base station. For the detailed obtaining process, reference can be made to the target traffic obtaining unit 701 in FIG. 4.

The judging unit 702 is configured to judge whether the current traffic of the system is greater than the target traffic.

The second adjusting unit 703 is configured to increase the increment step size of the system if the current traffic of the system is not greater than the target traffic of the system and the bandwidth of the multi-mode base station is idle, or decrease the decrement step size of the system if the current traffic of the system is not greater than the target traffic of the system and the bandwidth of the multi-mode base station is congested.

The first adjusting unit 704 and the controlling unit 705 are configured to adjust the step size of the system and control traffic according to the adjusted step size of the system if the current traffic of the system is greater than the target traffic. For the details about how the first adjusting unit 704 adjusts the step size, reference can be made to the first adjusting unit 402 in FIG. 4.

In this embodiment, if the current traffic of a system in the multi-mode base station is greater than the target traffic of the system, when the bandwidth of the multi-mode base station is idle, the controlling unit 705 controls, according to the increment step size adjusted by the first adjusting unit 704, the traffic of the system in the multi-mode base station to rise; when the bandwidth of the multi-mode base station is congested, the controlling unit 705 controls, according to the decrement step size adjusted by the first adjusting unit 704, the traffic of the system in the multi-mode base station to decrease; if the current traffic of a system in the multi-mode base station is not greater than the target traffic of the system, when the bandwidth of the multi-mode base station is idle, the controlling unit 705 controls, according to the increment step size adjusted by the second adjusting unit 703, the traffic of the system in the multi-mode base station to rise; when the bandwidth of the multi-mode base station is congested, the controlling unit 705 controls, according to the decrement step size adjusted by the second adjusting unit 703, the traffic of the system in the multi-mode base station to decrease. Finally, the traffic of the system is balanced when it approaches the target traffic of the system, and the traffic ratio of the system fulfills the traffic allocation ratio required by a user.

Alternatively, an embodiment of the present invention provides another traffic control apparatus, which includes a target traffic obtaining unit 701, a judging unit 702, a second adjusting unit 703, and a controlling unit 705.

The target traffic obtaining unit 701 is configured to obtain target traffic of any system in the multi-mode base station. For the detailed obtaining process, reference can be made to the target traffic obtaining unit 701 in FIG. 4.

The judging unit 702 is configured to judge whether the current traffic of the system is greater than the target traffic.

The second adjusting unit 703 is configured to increase the increment step size of the system if the current traffic of the system is not greater than the target traffic of the system and the bandwidth of the multi-mode base station is idle, or decrease the decrement step size of the system if the current traffic of the system is not greater than the target traffic of the system and the bandwidth of the multi-mode base station is congested.

The controlling unit 705 is configured to control traffic of the system in the multi-mode base station according to the increment step size or decrement step size adjusted by the second adjusting unit.

Figure 8:
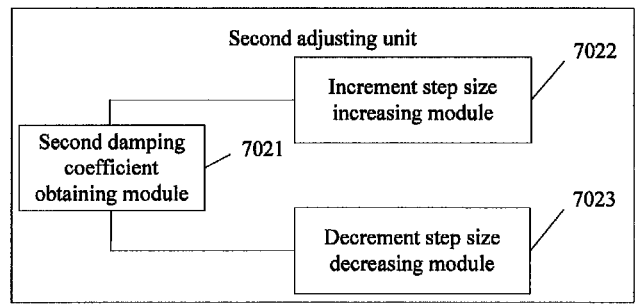
FIG. 8 is a schematic structural diagram of a second adjusting unit in an apparatus for controlling traffic of a multi-mode base station shown in FIG. 7.

Further, as shown in FIG. 8, the second adjusting unit 702 in this embodiment includes a second damping coefficient obtaining module 7021 and at least one of an increment step size increasing module 7022 and a decrement step size decreasing module 7023.

The second damping coefficient obtaining module 7021 is configured to obtain the damping coefficient of the system.

In this embodiment, how the second damping coefficient obtaining module 7021 obtains the damping coefficient is similar to how the first damping coefficient obtaining module 4021 obtains the damping coefficient, and details are not described herein.

The increment step size increasing module 7022 is configured to increase the increment step size of the system according to the damping coefficient obtained by the damping coefficient obtaining module when the bandwidth of the multi-mode base station is idle.

In this embodiment, the increment step size increasing module 7022 may include: an increment step size increasing sub-module, configured to increase the increment step size of the system to the sum of a preset step size of the system and the damping coefficient when the bandwidth of the multi-mode base station is idle.

Or, the decrement step size decreasing module 7023 is configured to decrease the decrement step size of the system according to the damping coefficient obtained by a damping coefficient obtaining unit when the bandwidth of the multi-mode base station is congested.

In this embodiment, the decrement step size decreasing module 7023 may include: a decrement step size decreasing sub-module, configured to decrease the decrement step size of the system to the difference between a preset step size of the system and the damping coefficient when the bandwidth of the multi-mode base station is congested.

In this embodiment, the second adjusting unit 702 may include a damping coefficient setting unit, or include a first deviation value obtaining unit, a second deviation value obtaining unit, and a damping coefficient setting unit, where the damping coefficient setting unit is configured to set the damping coefficient before obtaining the damping coefficient. For the detailed setting process, reference can be made to the first deviation value obtaining module 601, the second deviation value obtaining module 602, and the second setting module 603.

The apparatus for controlling traffic of the multi-mode base station in this embodiment may be installed in a multi-mode base station.

By using the apparatus for controlling traffic of a multi-mode base station in this embodiment of the present invention, when the current traffic of any system in the multi-mode base station is greater than the target traffic of the system, the increment step size or decrement step size of the system is adjusted accordingly according to usage of the bandwidth of the multi-mode base station, and the traffic of the system is controlled according to the adjusted step size, so that the traffic of the system approaches the target traffic corresponding to the traffic allocation ratio of the system in the traffic control process, and the traffic control of the multi-mode base station is implemented. With this embodiment of the present invention, traffic between different systems of a multi-mode base station can be allocated properly.

The method and the apparatus for controlling traffic of the multi-mode base station in the embodiments of the present invention may be applied in a multi-mode base station.

The above descriptions are merely about exemplary embodiments of the present invention, but not intended to limit the protection scope of the present invention. Any modifications, variations, or replacements that can be easily derived by those skilled in the art within the technical scope disclosed by the present invention shall fall within the protection scope of the present invention. Therefore, the protection scope of the present invention is subject to the appended claims.

What is claimed is:

1. A method for controlling traffic of a multi-mode base station, comprising:
   obtaining target traffic of any system in the multi-mode base station according to a preset traffic allocation ratio;
   decreasing an increment step size of the system to a difference between a preset step size of the system and a damping coefficient of the system if current traffic of the system is greater than the target traffic and bandwidth of the multi-mode base station is idle, and increasing a decrement step size of the system to a sum of a preset step size of the system and a damping coefficient of the system if current traffic of the system is greater than the target traffic and bandwidth of the multi-mode base station is congested, wherein the damping coefficient is a number that is in proportion to a difference between the current traffic of the system and the target traffic; and
   controlling traffic of the system in the multi-mode base station according to the adjusted increment step size or decrement step size.

2. The method for controlling traffic of a multi-mode base station according to claim 1, wherein:
   the decreasing the increment step size of the system comprises: obtaining the damping coefficient of the system;
   the increasing the decrement step size of the system comprises: obtaining the damping coefficient of the system.

3. The method for controlling traffic of a multi-mode base station according to claim 1, wherein:
   before the controlling the traffic of the system in the multi-mode base station, the method further comprises:
   increasing the increment step size of the system if the current traffic of the system is not greater than the target traffic and the bandwidth of the multi-mode base station is idle; or
   decreasing the decrement step size of the system if the current traffic of the system is not greater than the target traffic and the bandwidth of the multi-mode base station is congested.

4. The method for controlling traffic of a multi-mode base station according to claim 3, wherein:
   the increasing the increment step size of the system if the current traffic of the system is not greater than the target traffic and the bandwidth of the multi-mode base station is idle comprises: obtaining a damping coefficient of the system, and increasing the increment step size of the system according to the damping coefficient if the current traffic of the system is not greater than the target traffic and the bandwidth of the multi-mode base station is idle;
   the decreasing the decrement step size of the system if the current traffic of the system is not greater than the target traffic and the bandwidth of the multi-mode base station is congested comprises: obtaining a damping coefficient of the system, and decreasing the decrement step size of the system according to the damping coefficient if the current traffic of the system is not greater than the target traffic and the bandwidth of the multi-mode base station is congested.

5. The method for controlling traffic of a multi-mode base station according to claim 1, wherein:
   the any system in the multi-mode base station comprises: GSM system, WCDMA system, CDMA system, TD-SCDMA system, or LTE system.

6. A method for controlling traffic of a multi-mode base station, comprising:
   obtaining target traffic of any system in the multi-mode base station according to a preset traffic allocation ratio;
   decreasing an increment step size of the system if current traffic of the system is greater than the target traffic and bandwidth of the multi-mode base station is idle, or increasing a decrement step size of the system if current traffic of the system is greater than the target traffic and bandwidth of the multi-mode base station is congested; and
   controlling traffic of the system in the multi-mode base station according to the adjusted increment step size or decrement step size, wherein:
   the decreasing the increment step size of the system comprises: obtaining a damping coefficient of the system, and decreasing the increment step size of the system according to the damping coefficient, the decreasing the increment step size of the system according to the damping coefficient comprises: decreasing the increment step size of the system to a difference between a preset step size of the system and the damping coefficient; and
   the increasing the decrement step size of the system comprises: obtaining a damping coefficient of the system, and increasing the decrement step size of the system according to the damping coefficient, the increasing the decrement step size of the system according to the damping coefficient comprises: increasing the decrement step size of the system to a sum of a preset step size of the system and the damping coefficient.

7. A method for controlling traffic of a multi-mode base station, comprising:
   obtaining target traffic of any system in the multi-mode base station according to a preset traffic allocation ratio;
   decreasing an increment step size of the system if current traffic of the system is greater than the target traffic and bandwidth of the multi-mode base station is idle, or increasing a decrement step size of the system if current traffic of the system is greater than the target traffic and bandwidth of the multi-mode base station is congested; and
   controlling traffic of the system in the multi-mode base station according to the adjusted increment step size or decrement step size, wherein:
   before the controlling the traffic of the system in the multi-mode base station, the method further comprises:
   increasing the increment step size of the system if the current traffic of the system is not greater than the target traffic and the bandwidth of the multi-mode base station is idle, comprising:
      obtaining a damping coefficient of the system, and
      increasing the increment step size of the system according to the damping coefficient if the current traffic of the system is not greater than the target traffic and the bandwidth of the multi-mode base station is idle; or
   decreasing the decrement step size of the system if the current traffic of the system is not greater than the target traffic and the bandwidth of the multi-mode base station is congested, comprising:
      obtaining a damping coefficient of the system, and
      decreasing the decrement step size of the system according to the damping coefficient if the current traffic of the system is not greater than the target traffic and the bandwidth of the multi-mode base station is congested;
   the increasing the increment step size of the system according to the damping coefficient comprises: increasing the increment step size of the system to a sum of a preset step size of the system and the damping coefficient;
   the decreasing the decrement step size of the system according to the damping coefficient comprises: decreasing the decrement step size of the system to a difference between a preset step size of the system and the damping coefficient.

8. A communication apparatus for controlling traffic of a multi-mode base station, comprising:
   a memory comprising instructions and a processor configured to execute the instructions within the memory to implement:
      a target traffic obtaining unit, configured to obtain target traffic of any system in the multi-mode base station according to a preset traffic allocation ratio;
      a first adjusting unit, configured to decrease an increment step size of the system to a difference between a preset step size of the system and a damping coefficient of the system if current traffic of the system is greater than the target traffic obtained by the target traffic obtaining unit and bandwidth of the multi-mode base station is idle, and increase a decrement step size of the system to a sum of a preset step size of the system and a damping coefficient of the system if current traffic of the system is greater than the target traffic obtained by the target traffic obtaining unit and bandwidth of the multi-mode base station is congested, wherein the damping coefficient is a number that is in proportion to a difference between the current traffic of the system and the target traffic; and
      a controlling unit, configured to control traffic of the system in the multi-mode base station according to the increment step size or decrement step size adjusted by the first adjusting unit.

9. The communication apparatus for controlling traffic of a multi-mode base station according to claim 8, wherein the first adjusting unit comprises:
   a first damping coefficient obtaining module, configured to obtain a damping coefficient of the system; and
   at least one of an increment step size decreasing module and a decrement step size increasing module, wherein:
   the increment step size decreasing module is configured to decrease the increment step size of the system according to the damping coefficient obtained by the first damping coefficient obtaining module when the bandwidth of the multi-mode base station is idle;
   the decrement step size increasing module is configured to increase the decrement step size of the system according to the damping coefficient obtained by the first damping coefficient obtaining module when the bandwidth of the multi-mode base station is congested.

10. The communication apparatus for controlling traffic of a multi-mode base station according to claim 8, wherein the memory comprising the instructions and the processor executing the instructions are further configured to implement:
    a second adjusting unit, configured to increase the increment step size of the system if the current traffic of the system is not greater than the target traffic and the bandwidth of the multi-mode base station is idle, or decrease the decrement step size of the system if the current traffic of the system is not greater than the target traffic and the bandwidth of the multi-mode base station is congested.

11. The communication apparatus for controlling traffic of a multi-mode base station according to claim 10, wherein the second adjusting unit comprises:
    a second damping coefficient obtaining module, configured to obtain the damping coefficient of the system; and
    at least one of an increment step size increasing module and a decrement step size decreasing module, wherein:
    the increment step size increasing module is configured to increase the increment step size of the system according to the damping coefficient obtained by the second damping coefficient obtaining module when the bandwidth of the multi-mode base station is idle;
    the decrement step size decreasing module is configured to decrease the decrement step size of the system according to the damping coefficient obtained by the second damping coefficient obtaining unit when the bandwidth of the multi-mode base station is congested.

* * * * *